(12) United States Patent
Jernigan et al.

(10) Patent No.: US 8,224,864 B1
(45) Date of Patent: Jul. 17, 2012

(54) STRIPING DIRECTORIES ACROSS A STRIPED VOLUME SET BY THE FILENAMES CONTAINED IN THE DIRECTORIES

(75) Inventors: Richard Jernigan, Ambridge, PA (US); Robert Hyer, Mars, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 917 days.

(21) Appl. No.: 11/970,452

(22) Filed: Jan. 7, 2008

(51) Int. Cl.
*G06F 7/00* (2006.01)

(52) U.S. Cl. .................. 707/802; 711/114; 709/219

(58) Field of Classification Search .......... None
See application file for complete search history.

(56) References Cited

U.S. PATENT DOCUMENTS

| | | | | |
|---|---|---|---|---|
| 5,511,177 A * | 4/1996 | Kagimasa et al. | ............ | 711/114 |
| 5,873,103 A * | 2/1999 | Trede et al. | ............. | 1/1 |
| 5,884,303 A * | 3/1999 | Brown | .......... | 707/779 |
| 6,029,168 A * | 2/2000 | Frey | ........ | 1/1 |
| 6,058,400 A * | 5/2000 | Slaughter | ............ | 1/1 |
| 6,145,094 A * | 11/2000 | Shirriff et al. | ........... | 714/11 |
| 6,385,625 B1 * | 5/2002 | Slaughter | ............ | 1/1 |
| 6,775,679 B2 * | 8/2004 | Gupta | .......... | 1/1 |
| 6,920,494 B2 | 7/2005 | Heitman et al. | | |
| 7,007,024 B2 * | 2/2006 | Zelenka | ......... | 707/741 |
| 7,024,531 B2 | 4/2006 | Saika | | |
| 7,032,091 B2 | 4/2006 | Ueno | | |
| 7,272,613 B2 * | 9/2007 | Sim et al. | ............. | 709/223 |
| 7,441,052 B2 | 10/2008 | Demaray et al. | | |
| 2002/0120763 A1 * | 8/2002 | Miloushev et al. | ........... | 709/230 |
| 2002/0133491 A1 * | 9/2002 | Sim et al. | .......... | 707/10 |
| 2004/0133606 A1 * | 7/2004 | Miloushev et al. | ........... | 707/200 |
| 2005/0097132 A1 | 5/2005 | Cochran et al. | | |
| 2005/0120078 A1 * | 6/2005 | Kazar et al. | .............. | 709/203 |
| 2005/0192932 A1 * | 9/2005 | Kazar et al. | .............. | 707/1 |
| 2006/0074925 A1 * | 4/2006 | Bixby et al. | ................. | 707/100 |
| 2006/0080353 A1 * | 4/2006 | Miloushev et al. | ........... | 707/102 |
| 2006/0095695 A1 | 5/2006 | Daniels et al. | | |
| 2006/0184731 A1 * | 8/2006 | Corbett et al. | .............. | 711/114 |
| 2007/0094378 A1 | 4/2007 | Baldwin et al. | | |
| 2007/0255925 A1 | 11/2007 | Serizawa et al. | | |

OTHER PUBLICATIONS

Preslan, K.W.; Barry, A.P.; Brassow, J.E.; Erickson, G.M.; Nygaard, E.; Sabol, C.J.; Soltis, S.R.; Teigland, D.C.; O'Keefe, M.T.; , "A 64-bit, shared disk file system for Linux," Mass Storage Systems, 1999. 16th IEEE Symposium on , vol., No., pp. 22-41, 1999.*
Xiaohui Shen; Choudhary, A.; , "DPFS: a distributed parallel file system," Parallel Processing, International Conference on, 2001. , vol., No., pp. 533- 541, Sep. 3-7, 2001.*
Non final Office Action, U.S. Appl. No. 12/037,363, dated Jun. 2, 2011.

* cited by examiner

*Primary Examiner* — Robert Timblin
*Assistant Examiner* — Richard Bowen
(74) *Attorney, Agent, or Firm* — Blakely, Sokoloff, Taylor & Zafman LLP

(57) ABSTRACT

A method and apparatus for striping a directory across storage server nodes. Each storage server node services one of a plurality of persistent mass storage facilities. The method comprises mapping each filename in the directory to one of the persistent mass storage facilities. According to the mapping of the filenames, the directory is distributed across the storage server nodes for storage on the persistent mass storage facilities.

19 Claims, 9 Drawing Sheets

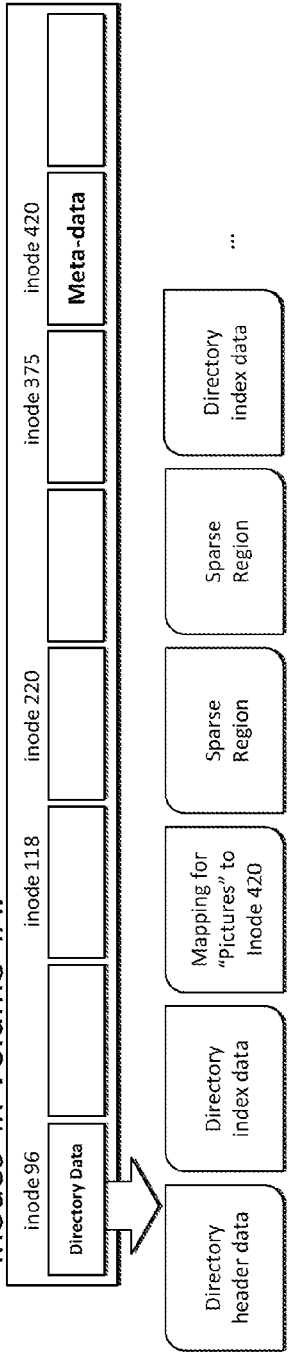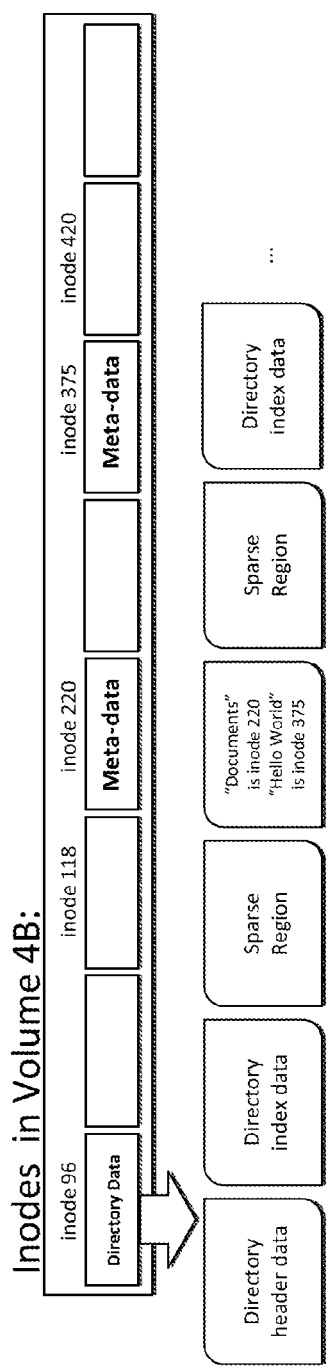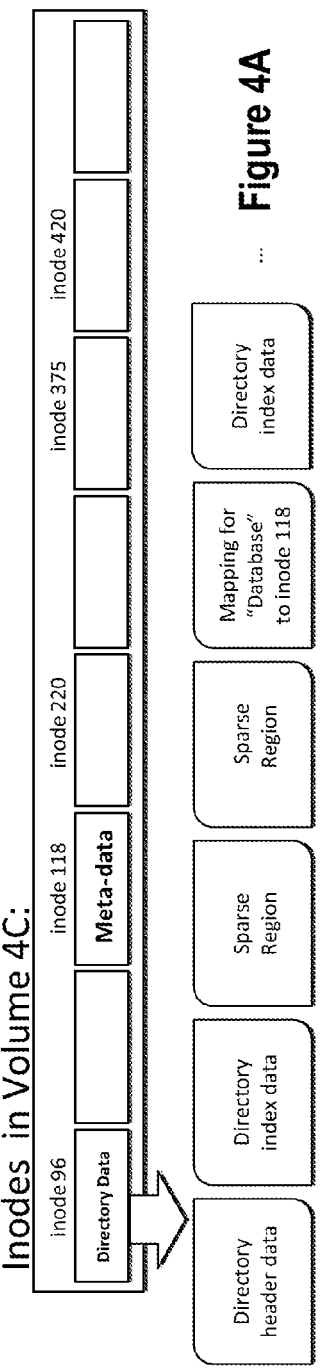
Figure 4A

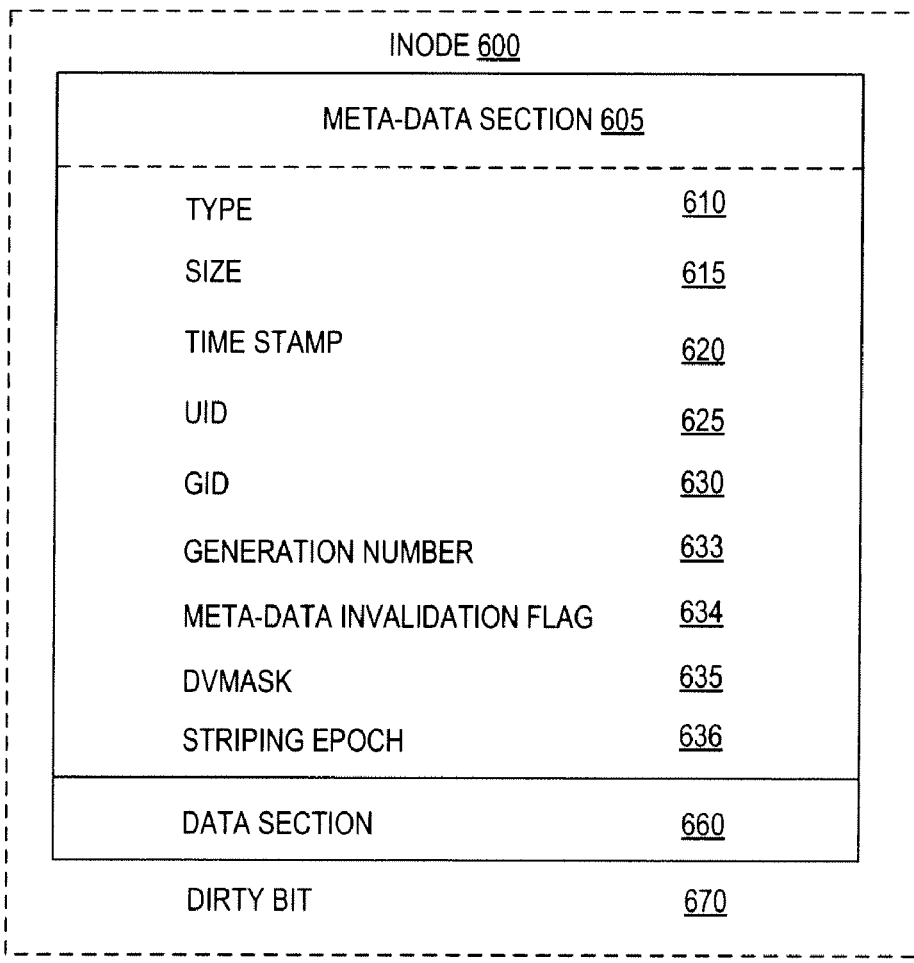

US 8,224,864 B1

STRIPING DIRECTORIES ACROSS A STRIPED VOLUME SET BY THE FILENAMES CONTAINED IN THE DIRECTORIES

FIELD OF THE INVENTION

At least one embodiment of the invention pertains to network storage systems, and more particularly, to a cluster of storage server nodes that manage striped directories.

BACKGROUND

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), and the like.

A network-based storage system typically includes at least one storage server node ("node"), which is a processing system configured to store and retrieve data on behalf of one or more client processing systems ("clients"). A storage server node may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups. A storage server node may provide clients with block-level access in addition to file-level access.

A plurality of storage server nodes may be interconnected to provide a storage system environment. Each storage server node may be configured to manage and provide access to (to "service") one or more volumes, with each volume storing files of one or more types (e.g., regular data files or directories). Conventionally, directories are usually stored on a small number of volumes. Thus, a large number of directory access requests issued by the clients are often directed to a small number of volumes serviced by a particular storage server node. As a result, the storage server node attempting to service the directory access requests may become overburdened, and the overall system speed and performance may be degraded.

SUMMARY OF THE INVENTION

The present invention includes a method and apparatus for striping a directory across storage server nodes. Each storage server node services one of a plurality of persistent mass storage facilities. The method comprises mapping each filename in the directory to one of the persistent mass storage facilities. According to the mapping of the filenames, the directory is distributed across the storage server nodes for storage on the persistent mass storage facilities.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4A illustrates an example of a mapping from filenames to volumes.

FIG. 5 illustrates an example of the format of a file handle.

FIG. 6 illustrates an example of the format of an inode.

DETAILED DESCRIPTION

Figure 1:
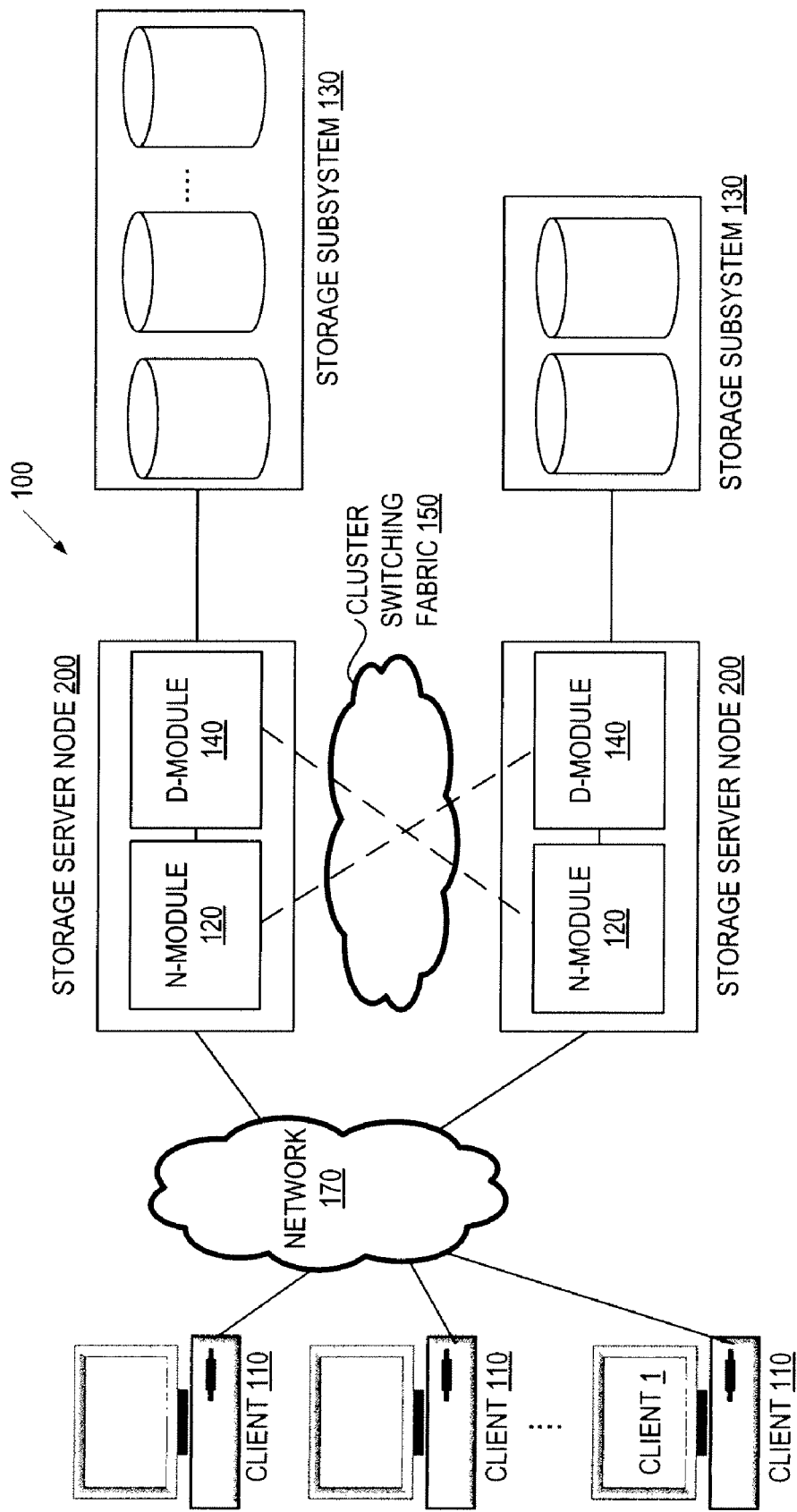
FIG. 1 illustrates an embodiment of a plurality of storage server nodes interconnected as a cluster a network.

A method and apparatus for striping directories are described. References in this specification to "an embodiment", "one embodiment", or the like, mean that the particular feature, structure or characteristic being described is included in at least one embodiment of the present invention. However, occurrences of such phrases in this specification do not necessarily all refer to the same embodiment.

In one aspect, the technique described herein distributes the contents of directories across multiple volumes (referred to as a striped volume set) that are serviced by multiple storage server nodes. There is no single, designated volume that stores all of the directories in a file system. Distributing directory contents across multiple storage servers reduces the potential bottleneck, in any single storage server node, caused by directory access requests.

In another aspect, a directory is striped by the filenames contained therein. A directory generally contains a plurality of filenames, as well as the mapping (also referred to as the "filename mapping") of the filenames to their corresponding inode numbers. An inode number is an identifier to a meta-data container ("inode"), which includes the meta-data (or equivalently, "meta-data attributes") of a file. A description of the inode will be provided in greater detail below with reference to FIG. 6. Striping a directory by the filenames significantly reduces the complexity of locating a filename mapping in a striped volume set. To determine which constituent volume in a striped volume set contains a filename mapping, the filename is first converted into a numerical string, which is then hashed and mapped into a volume number. The volume number identifies a constituent volume in the striped volume set that stores the portion of the directory containing the filename mapping.

The technique described herein can be applied to directories at any levels of a file system hierarchy. The root directory and subdirectories at any level below the root can be striped according to the technique described herein.

In yet another aspect, an inode number of a file can be chose during file creation such that the corresponding inode resides on the same constituent volume that holds the filename. Therefore, once the filename mapping for a file is located on a volume, the same volume can be searched to locate the inode of the file. An inode of a file is stored in a volume that is determined by its inode number; illustratively, by taking the inode number modulo the total number of volumes in a striped volume set. The volume that holds the inode of a file is referred to as the File Attribute Volume (FAV) for the file. Other volumes may cache the inode as necessary. The volume that is selected as the FAV for the file can be determined by the inode number of that file. Thus, once a given filename is mapped to a volume using the conversion and hashing operations described above, the same volume typically can be searched for the inode associated with that file. Not only is this simple rule convenient, but it also optimizes the location of the inode and the meta-data contained in the inode. That is, a request to access information (e.g., meta-data attributes) of a file can often be satisfied by one single volume without having to access other volumes.

In general, the filename-owning volume is the FAV of the file at the time when the file is created, and continues to be the FAV of that file throughout the operation of the file system. However, in some situations, the volume that owns the filename may be changed, at some point after the file creation, to another volume different from the FAV of that file. Illustratively, during the operation of a file system, a client could rename the file. Renaming is an operation which may move a filename to a different volume served by a different node, but does not change its inode number. In this scenario, the filename is not stored on the same node as the FAV for the file. Maintaining a correlation between the name-owning volume and the FAV is a highly useful optimization as it reduces the time to locate the FAV. However, this correlation is not necessary for correct operations and is not guaranteed in some situations.

Before further discussing this technique, it is useful to discuss certain background information and to define certain terminology. In some conventional storage servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. A "file system" is an independently managed, self-contained, hierarchal set of data units (e.g., files, blocks, or logical unit numbers (LUNs)). Although a volume or file system (as those terms are used herein) may store data in the form of files, that is not necessarily the case. That is, a volume or file system may store data in the form of other units of data, such as blocks or LUNs.

To keep track of the organization of blocks stored in an aggregate, a storage server maintains various hierarchical data structures, called buffer trees. A buffer tree is a hierarchical metadata structure (e.g., a linked list) used by a file system to keep track of the locations of the data blocks of a file, and the root of which is the inode of the file. A buffer tree includes one or more levels of indirect blocks (called "L1 blocks", "L2 blocks", etc.), each of which contains one or more pointers to lower-level indirect blocks and/or to the direct blocks ("L0 blocks") of the file. The direct blocks contain the actual data of the file. A buffer tree may represent, for example, a volume defined within an aggregate, or a file or a directory defined within a volume. The root of the buffer tree is known as an "inode", which is a metadata structure that contains metadata about the file or the directory. The structure of an inode will be described in greater detail with reference to FIG. 6.

FIG. 1 shows a simple example of a network environment which incorporates a plurality of storage server nodes 200 interconnected as a cluster 100. Each storage server node 200 can be a file server or "filer," in which the technique introduced here can be implemented. It should also be noted that the technique described herein can be applied in other types of storage systems, such as storage servers which provide clients with either or both of block-level access and file-level access to stored data or processing systems other than storage servers, and network devices configured to provide storage services.

Referring to FIG. 1, each of the storage server nodes 200 is coupled to a storage subsystem 130 which includes a plurality of persistent mass storage facilities (illustratively, an array of mass storage devices, such as disks), and to a set of storage clients 110 (hereinafter simply "clients") through a network 170. The network 170 may be, for example, a local area network (LAN), a wide area network (WAN), a metropolitan area network (MAN), a global area network (GAN), such as the Internet, a Fibre Channel fabric, or the like, or a combination of any such types of networks. Each of the clients 110 may be, for example, a conventional personal computer (PC), server-class computer, workstation, or the like.

The storage subsystem 130 is managed by the storage server nodes 200. Each storage server node 200 receives and responds to various read and write requests from the clients 110, directed to data stored in or to be stored in the storage subsystem 130. The mass storage devices in the storage subsystem 130 may be, for example, conventional magnetic disks, optical disks such as CD-ROM or DVD-based storage, magneto-optical (MO) storage, or any other type of non-volatile storage devices suitable for storing large quantities of data.

Although illustrated as a self-contained element, each storage server node 200 may have a distributed architecture; for example, it may include a separate N- ("network") module 120 and D- ("data") module 140. In such an embodiment, the N-module 120 is used to communicate with clients 110, while the D-module 140 includes the file system functionality and is used to communicate with an associated one of the storage subsystems 130. The N-module 120 and D-module 140 can communicate with each other using an internal protocol via a cluster switching fabric 150. Alternatively, the storage server node 200 may have an integrated architecture, where the network and data components are all contained in a single box. In this way, all of the storage subsystems 130 can form a single storage pool, to which any client of any of the storage servers has access. The N-module 120 and D-module 140 may be implemented by hardware, software, or a combination of both.

Figure 2:
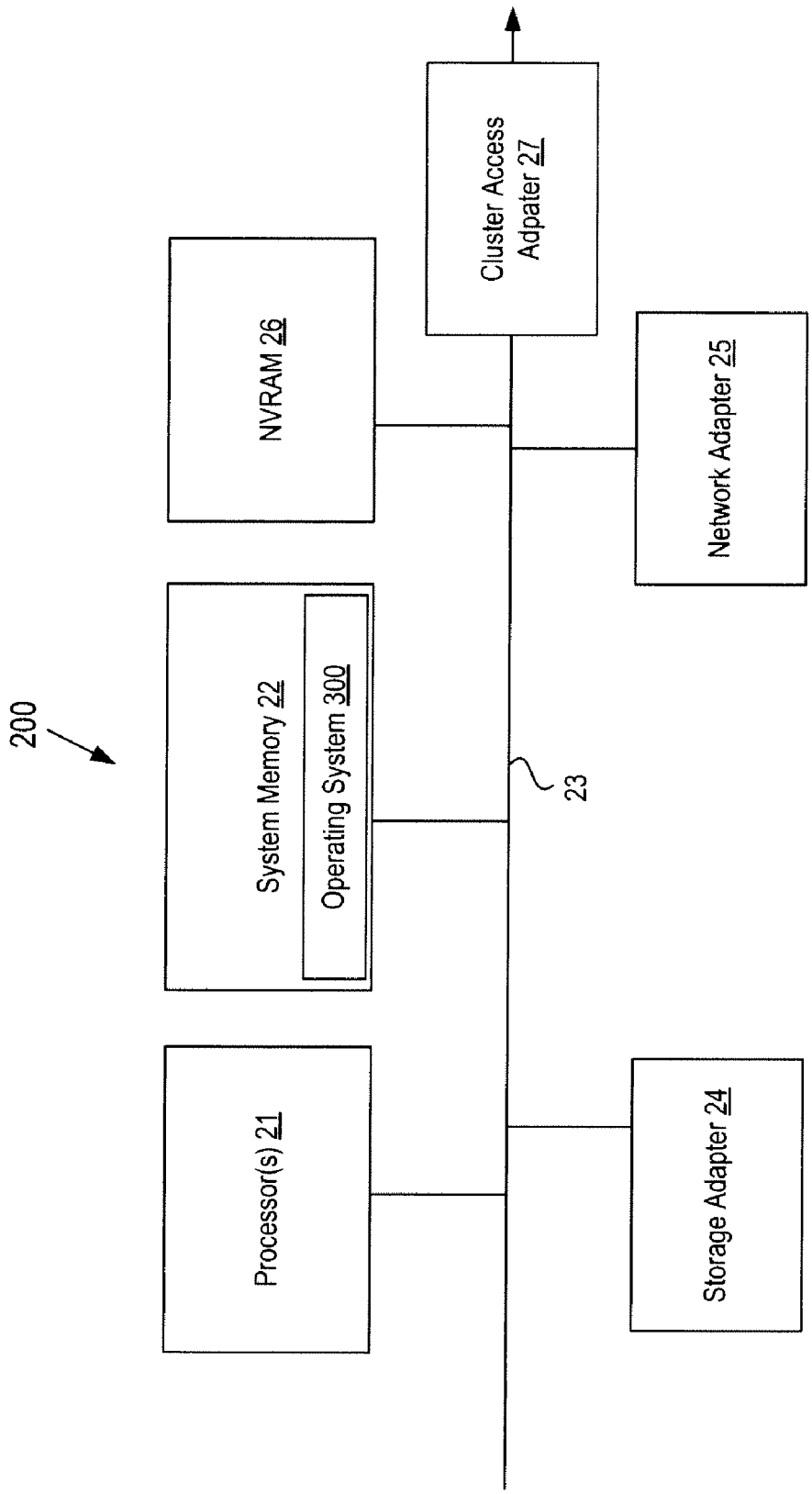
FIG. 2 illustrates an example of the hardware architecture of a storage server node.

FIG. 2 is a block diagram showing an example of the architecture of the storage server node 200 at a high level. Certain standard and well-known components, which are not germane to the present invention, are not shown. The storage server node 200 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 21 are the central processing units (CPUs) of the storage server node 200 and, thus, control its overall operation. In certain embodiments, the processors 21 accomplish this by executing software stored in memory 22. Such processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Illustratively, the processors 21 may include a first processor executing the functions of the N-module 120 on the node 200, and a second processor executing the functions of the D-module 140. However, it will be apparent to those of ordinary skill in the art that the node 200 may alternatively comprise a single processor or more than two processors.

Memory 22 includes the main memory (i.e., the "system memory") of the storage server node 200. Memory 22 represents any form of random access memory (RAM), read-only memory (ROM), flash memory, or the like, or a combination of such devices. Memory 22 stores (among other things) a storage operating system 300, which can implement the technique introduced herein.

Also connected to the processors 21 through the bus system 23 are a storage adapter 24, a network adapter 25 and a cluster access adapter 27. The storage adapter 24 allows the storage server node 200 to access the storage subsystem 130 of FIG. 1, and may be, for example, a Fibre Channel adapter or a SCSI adapter. The network adapter 25 provides the storage server node 200 with the ability to communicate with remote devices, such as the clients 110, over a network and may be, for example, an Ethernet adapter, a Fibre Channel adapter, or the like. The cluster access adapter 27 couples the storage server node 200 to other nodes of the cluster 100 over the cluster switching fabric 150.

The storage server node 200 also includes NVRAM 26 to provide fault-tolerant backup of data. The NVRAM 26 is typically a large-volume solid-state memory array having either a backup battery, or other built-in last-state-retention capabilities (e.g. a FLASH memory), that holds the last state of the memory in the event of any power loss to the array.

Figure 3:
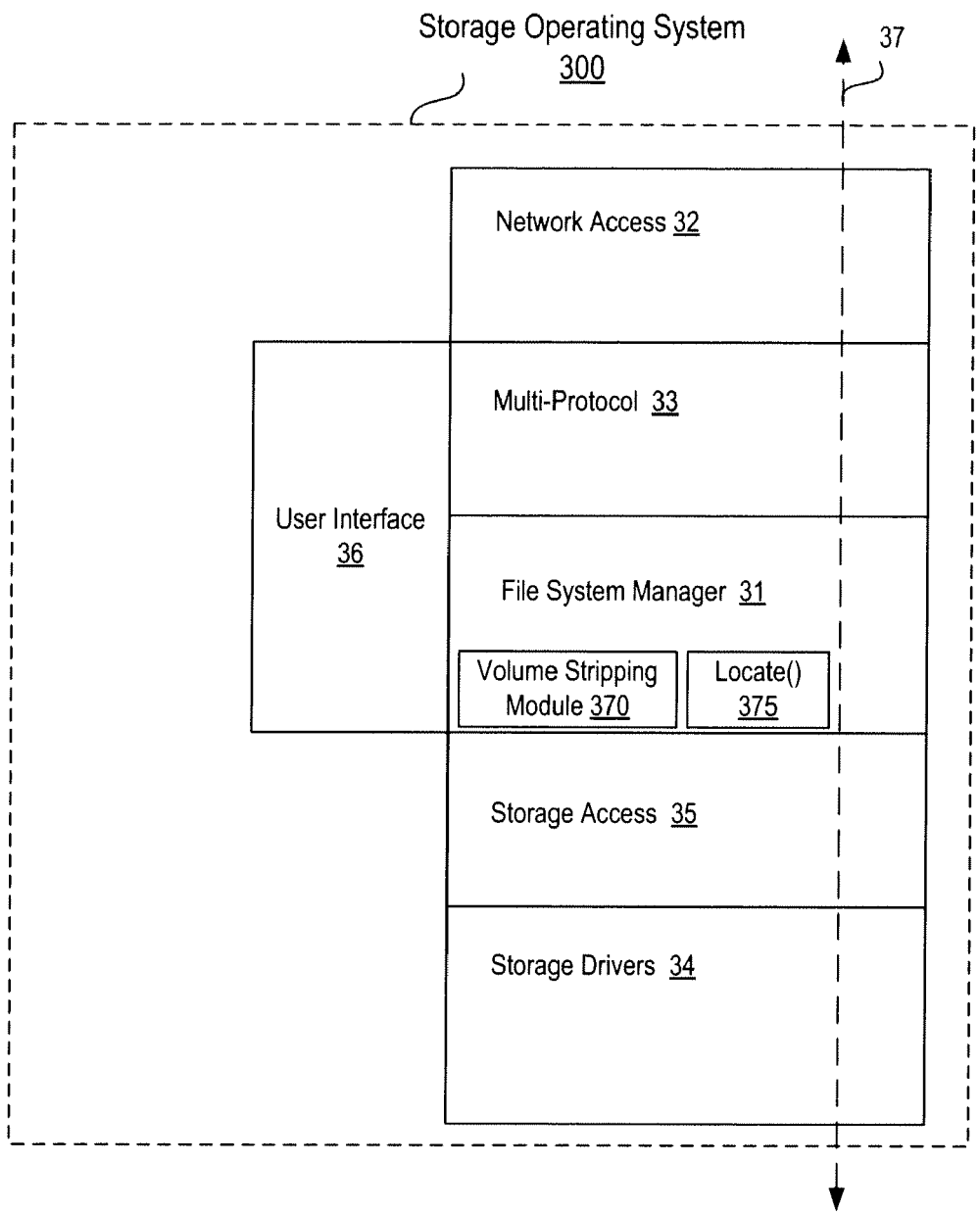
FIG. 3 illustrates the architecture of an operating system of the storage server node according to an embodiment of the invention.

FIG. 3 illustrates an example of the storage operating system 300 for controlling the operations of the storage server node 200. The operating system 300 and its constituent elements are preferably implemented in the form of software. However, in some embodiments, some or all of the elements of the operating system may be implemented in the form of hardware (e.g., specially designed circuitry), or as a combination of hardware and software.

As shown, the operating system 300 includes several modules, or "layers". These layers include a file system manager 31. The file system manager 31 is software that manages the one or more file systems managed by the storage server node 200. In particular, the file system manager 31 imposes a hierarchy (e.g., a directory/file structure) on the data stored in the storage subsystem 130 and manages client-initiated read and write operations at a high level (while delegating certain functions to lower layers of the operation system 300).

To allow the storage server node 200 to communicate over the network 170 (e.g., with clients 110), the operating system 300 also includes a network access layer 32, and a multi-protocol layer 33 operatively coupled between the file system manager 31 and the network access layer 32. The network access layer 32 and the multi-protocol layer 33 implement, at least partially, the network functions of the N-module of FIG. 1. The multi-protocol layer 33 includes a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 32 includes one or more drivers which implement one or more lower-level protocols to communicate over the network, such as Ethernet or Fibre Channel.

To enable the storage server node 200 to communicate with the storage subsystem 130, the operating system 300 includes a storage driver layer 34, and a storage access layer 35 operatively coupled between the file system manager 31 and the storage driver layer 34. The storage driver layer 34 and the storage access layer 35 implement, at least partially, the data-access functions of the D-module of FIG. 1. The storage access layer 35 implements a higher-level disk storage protocol, such as RAID-4, RAID-5 or RAID-DP, while the storage driver layer 34 implements a lower-level storage device access protocol, such as Fibre Channel Protocol (FCP) or SCSI. The storage access layer 35 is alternatively called the "RAID layer" in this description.

Also shown in FIG. 3 is the path 37 of data flow, through the operating system 300, associated with a client-initiated read or write request.

The operating system 300 also includes a user interface 36 to generate a command line interface (CLI) and/or graphical user interface (GUI), to allow administrative control and configuration of the storage server node 200, from a local or remote terminal.

In one embodiment in accordance with the present invention, the file system manager 31 includes a volume striping module (VSM) 370 that implements striped directories in the manner described above and further described below. The VSM 370 implements data access functions and, therefore, is located on the D-module 140 of the storage server node 200 in an embodiment of the invention. As described further herein, the VSM 370 of the D-module 140 interacts with a Locate( ) function 375 implemented by the N-module 120. Using the Locate( ) function 375, the N-module 120 is able to determine an appropriate D-module 120 servicing the volume that holds a requested filename in a directory. That is, when the N-module 120 of a first node receives a request for directory content, the Locate( ) function 375 of that N-module 120 computes a location. If the computed location is a volume serviced by the D-module 140 of a second node, the N-module 120 of the first node will forward that request to the D-module 140 of the second node. Otherwise, the N-module 120 of the first node will forward that request to the D-module 140 of the same node. The VSM 370 of the receiving D-module 140 will then perform the requested file operations.

FIG. 4A illustrates an example of striping a directory across three volumes (4A, 4B and 4C). Each of the three volumes (4A, 4B and 4C) is serviced by, illustratively, a separate one of three storage server nodes (not shown). Having each volume serviced by a separate node minimizes the bottleneck caused by the CPU consumption on the filer. However, it is understood that different embodiments of the present invention may have more than one volume serviced by the same node. Volumes 4A, 4B and 4C form a Striped Volume Set (SVS) across which a striped directory is distributed. Thus, volumes 4A, 4B and 4C are also referred to as the constituent volumes of the SVS.

Referring to FIG. 4A, for illustration purpose, each of the horizontal bars is used to represent an inodefile, which includes a number of inodes (represented by the blocks inside the horizontal bar). Illustratively, the directory is associated with an inode number 96 and contains filenames "Pictures", "Documents", "Hello World.txt" and "Database". The mapping of four filenames to their respective inode numbers are, illustratively:

"Pictures"→inode 420,
"Documents"→inode 220,
"Hello World.txt"→inode 375, and
"Database"→inode 118.

The four filename mappings are distributed across volumes 4A, 4B and 4C according to the techniques described herein. As shown in FIG. 4A, inode 96 associated with the striped directory is distributed across volumes 4A, 4B and 4C. The portion of inode 96 on each volume points to a directory structure consisting of a plurality of blocks. The filename mappings are stored in the blocks of the directory structure on these volumes.

Figure 4B:
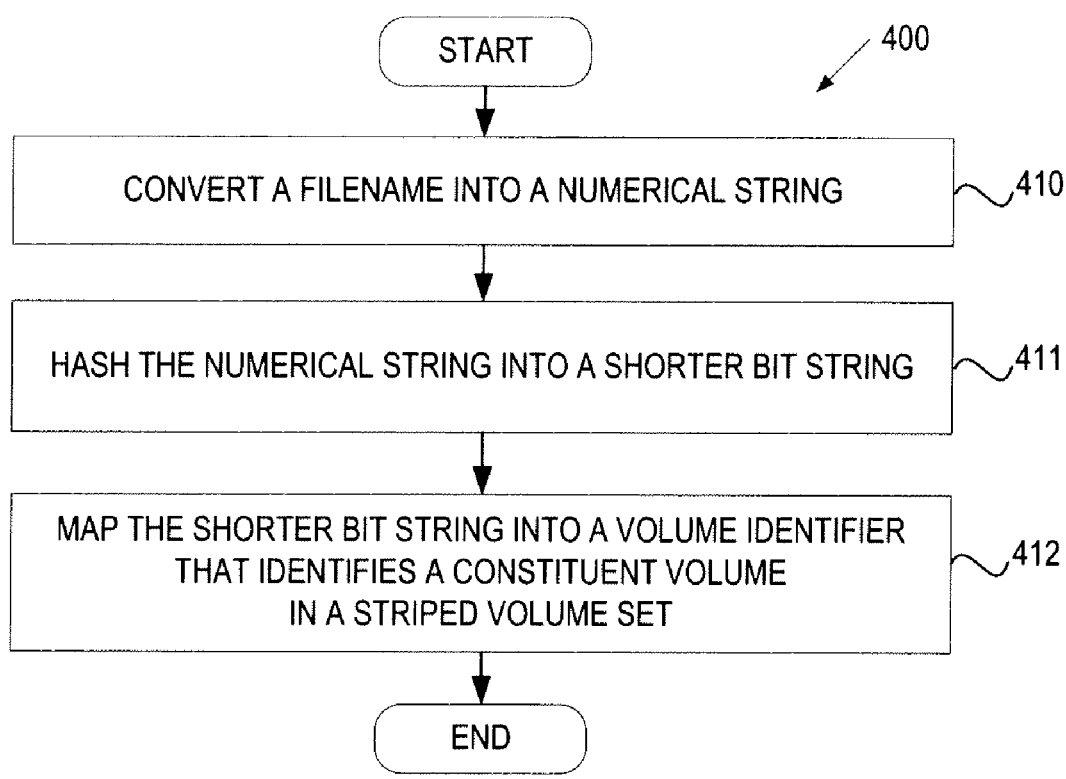
FIG. 4B illustrates an example of a process for determining the volume to which a filename is mapped.

To determine which volume stores the mapping of a filename to its associated inode number, the Locate( ) function 375 of FIG. 3 converts the filename (e.g., "Pictures") into a volume identifier using a striping algorithm. Referring to FIG. 4B, an embodiment of a process 400 for converting a filename into a volume identifier is described. At block 410, the filename is converted into a numerical string using a conversion algorithm (e.g., by mapping each character into a unique bit string). At block 411, the numerical string can be further hashed into a shorter bit string. At block 412, the shorter bit string is mapped into a volume identifier (e.g., taking the shorter bit string modulo three). The resulting value (the volume identifier) uniquely identifies one of the volumes (4A, 4B, or 4C) on which the filename should be stored. Thus, instead of storing a directory on a single volume, a striped directory is distributed across the multiple volumes in an SVS. Each volume in the SVS may store a different number of filenames.

Furthermore, the storage server node 200 uses the inode number of a file to locate an inode of that file. The inode number can be mapped to a volume that stores the inode (i.e., the FAV of the file). In the example shown in FIG. 4, the volume that "owns" or "holds" (stores the mapping of) a filename is preferentially the same volume as the FAV for the file having the filename. This feature can be enforced by selecting an inode number, at the time of file creation, that is mapped to the same volume as the filename holding volume. Illustratively, the FAV for the file "Hello World.txt" is volume 4B, which is the same volume that stores the mapping "Hello World.txt"→inode 375. Thus, once a filename is located in a volume, a storage server node 200 can search the same volume to look up the inode of that file. However, in some less common situations that occur after the file creation, the FAV for a file may not be the same volume that owns the filename. Illustratively, when a file is renamed, the mapping of the renamed filename may migrate to a different volume, while the inode number of that file stays the same. As a result, the FAV of the renamed file does not move, but the mapping of the filename may move to a different volume according to the new filename. In another example, when multiple hard-links are linked to a file, it is likely that most of those hard-link filenames will not be mapped to the same volume. Illustratively, a filename "Hello World.txt" may be linked by "Link A.txt" and "Link B.txt". The names of these hard-links ("Link A.txt" and "Link B.txt") can be used as the aliases of the filename ("Hello World.txt"), and, therefore, can be mapped to volumes using the same filename conversion process as shown in FIG. 4B. However, as the filename and the names of these hard-links are different, they may be mapped to different volumes. As there is only one FAV for each file and there are multiple volumes holding the different hard-link filenames, the FAV and the volumes holding the filenames in this situation cannot be guaranteed to be the same. One possible scenario in which the FAV and the name-owning volumes may all be the same if the filenames happen to hash to the same volume as the inode number. As indicated above, these situations (e.g., renaming and multiple hard-links) are comparably rare in the normal operations of a file system.

A striped directory can be accessed by its file handle, which uniquely identifies the directory in the file system. FIG. 5 is a schematic block diagram illustrating an example of the format of a file handle 500. The file handle 500 for a striped directory includes a Striped Volume Set (SVS) ID field 502, an inode number field 504, a unique-ifier field 506, a striped flag field 508 and a striping epoch number field 510. The SVS ID field 502 contains a global identifier (within the cluster 100) of the SVS within which the directory resides. The inode number field 504 contains an inode number of an inode (within an inode file) pertaining to the directory. The unique-ifier field 506 contains a monotonically increasing number that uniquely identifies the file handle 500 for the directory. The unique-ifier is useful in the case where an inode number has been deleted, reused and reassigned to a new file. The unique-ifier distinguishes that reused inode number from a potentially previous use of the same number. The striped flag field 508 is illustratively a Boolean value that identifies whether currently the directory is striped or not. The striping epoch number field 510 indicates the appropriate striping technique for embodiments where the SVS utilizes differing striping techniques for different directories.

FIG. 6 is a schematic block diagram of an inode 600 of a file (e.g., a directory or a regular data file), which contains meta-data attributes of the file and is stored on the FAV for the file. As mentioned above, the inode 600 is associated with an inode number (FIG. 5) which can be mapped to one of the volumes (i.e., the FAV for the file). Illustratively, inode 600 includes a meta-data section 605 that stores the meta-data attributes of the file, and a data section 660. In one embodiment, some or all of the meta-data section 605 may be cached on volumes other than the FAV (e.g., the constituent volumes of a SVS), and the data section 660 in each of the constituent volumes holds different data (e.g., the striped directory contents). The information stored in the meta-data section 605 of each inode 600 describes the file and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 633, a meta-data invalidation flag field 634, a dvmask 635 and a striping epoch 636 of the inode. As described further herein, meta-data invalidation flag field 634 is used to indicate whether the meta-data in this inode 600 is valid. The invalidation flag field 634 of a cached copy may be set invalid if contents of the inode 600 on the FAV have been modified. The dvmask 635 is stored at the FAV, and is used to remember which other volumes have cached this inode. The striping epoch 636 is stored at the FAV and cached at other DVs, and indicates the layout of information in the file or directory. The contents of the data section 660 of each inode depend upon the type of file (inode) defined within the type field 610. For example, the data section 660 of a directory inode contains meta-data controlled by the file system, such as a pointer to a block that contains the mapping of a filename to an inode number.

Additionally, inode 600 may contain information such as a "dirty" bit 670. After data in the inode (or blocks pointed to by the inode) is updated or modified as instructed by, e.g., a write operation, the modified data is marked "dirty" by setting the dirty bit 670 so that the inode (block) can be subsequently "flushed" (stored) to a disk.

Figure 7:
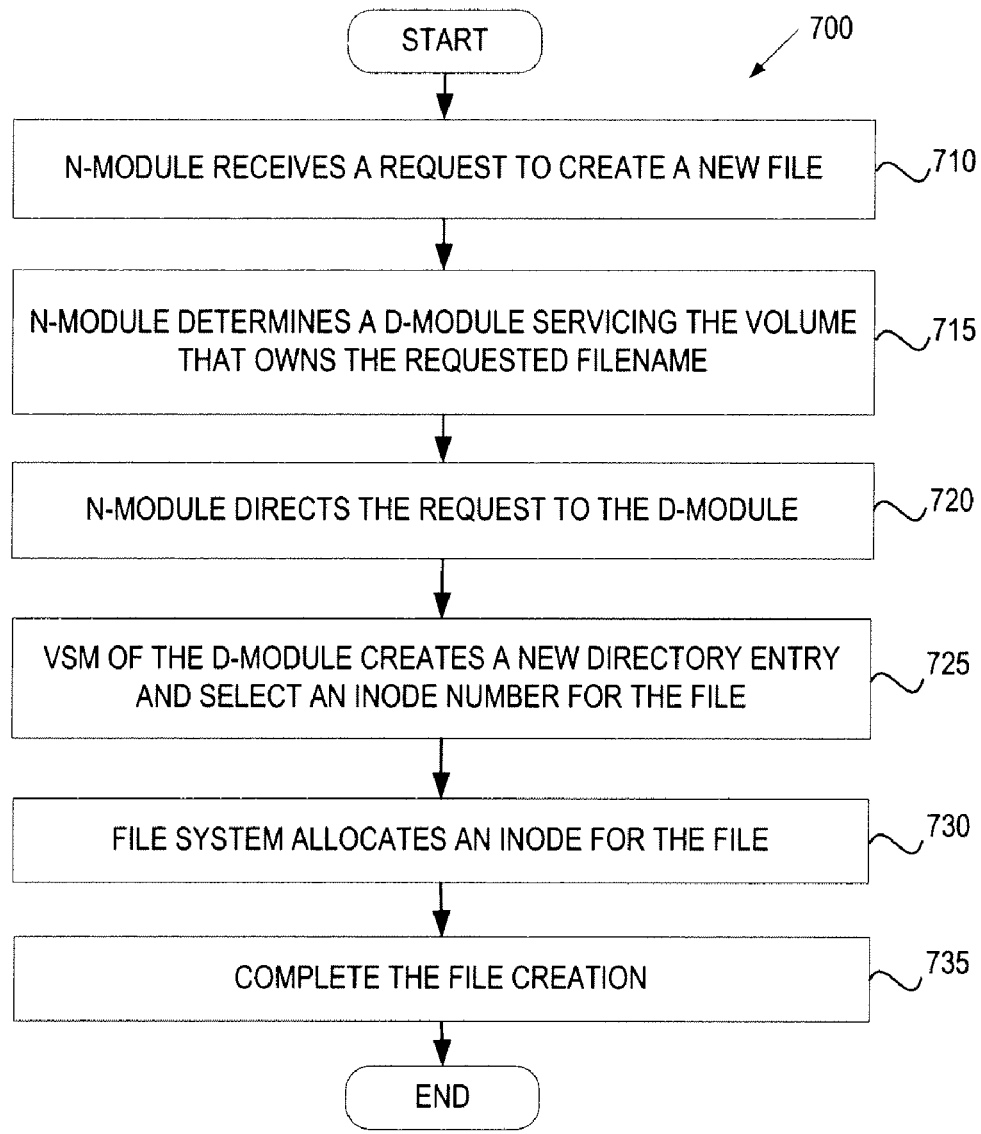
FIG. 7 is a flow diagram illustrating an embodiment of a process for creating a file.

According to the storage system architecture described herein, a plurality of file operations involve the access of directory contents. These file operations include, among others, create file, delete file, and retrieve file attributes. FIG. 7 is a flowchart illustrating a process 700 for creating a new file in accordance with an embodiment of the present invention. Details not germane to the present invention are omitted from the following description. The process begins at block 710 with one of the N-modules 120 of FIG. 1 receiving a request to create a new file from a client 110. At block 715, the N-module 120 determines the D-module 140 servicing the volume that owns the requested filename. In one embodiment, the volume that owns the requested filename is determined by the N-module 120 using the Locate( ) function 375 of FIG. 3 to convert and hash the requested filename to a volume identifier. At block 720, the N-module 120 re-directs the request to the D-module 140 determined at block 715 by, illustratively, issuing a create file procedure call to the VSM 370 of the D-module 140.

Upon receiving the create file procedure call, at block 725, the VSM 370 of the D-module 140 that receives the call processes that call by creating a new directory entry for the file in the same volume that owns the filename. The new directory entry contains a mapping from the requested filename to a selected inode number. In one embodiment, the inode number is selected such that it is mapped to the same volume that owns the filename. Since the filename is being created at this particular volume, the inode number is selected such that its inode will also reside on this volume. At block 730, the VSM 370 passes the file create request to the file system, which allocates an inode for the file using a conventional inode allocation technique. At block 735, the VSM 370 completes file creation by, e.g., instructing the file system operating on the D-module 140 to create a file using the allocated inode.

Figure 8:
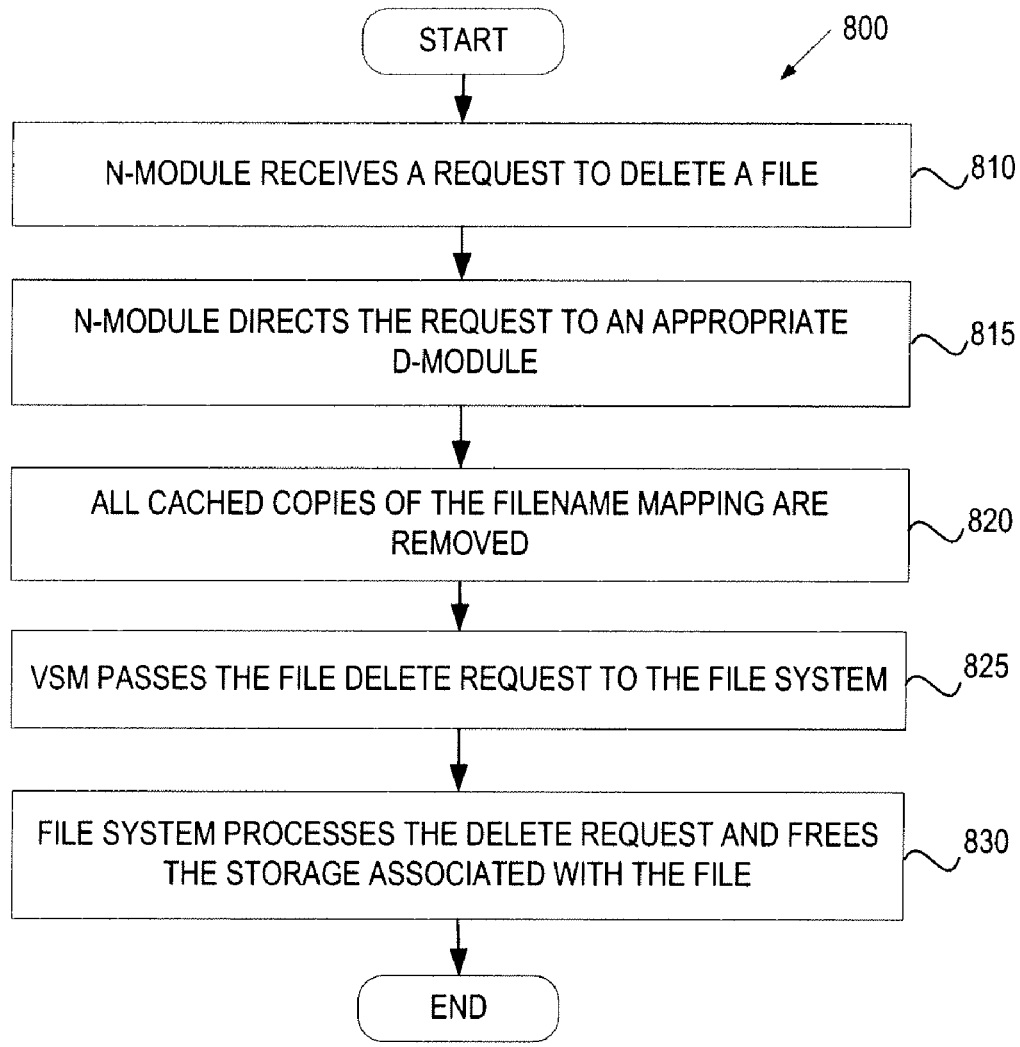
FIG. 8 is a flow diagram illustrating an embodiment of a process for deleting a file.

FIG. 8 is a flowchart illustrating a process 800 for deleting a file in accordance with an embodiment of the present invention. Similar to the process 700 described above, details that are not germane to the purpose of this disclosure are herein omitted. The process 800 begins at block 810 where one of the N-modules 120 receives a client request to delete a file. At block 815, the N-module 120 re-directs the request as a delete file procedure call to the VSM 370 of the D-module 140 serving the volume that owns the requested filename. At block 820, the VSM 370 determines whether the mapping of the requested filename has been cached at other volumes and causes the removal of all of the cached copies. At block 825, the VSM 370 passes the delete request to the file system. At block 830, the file system processes the delete request and frees the storage associated with the file, and the process 800 completes.

Figure 9:
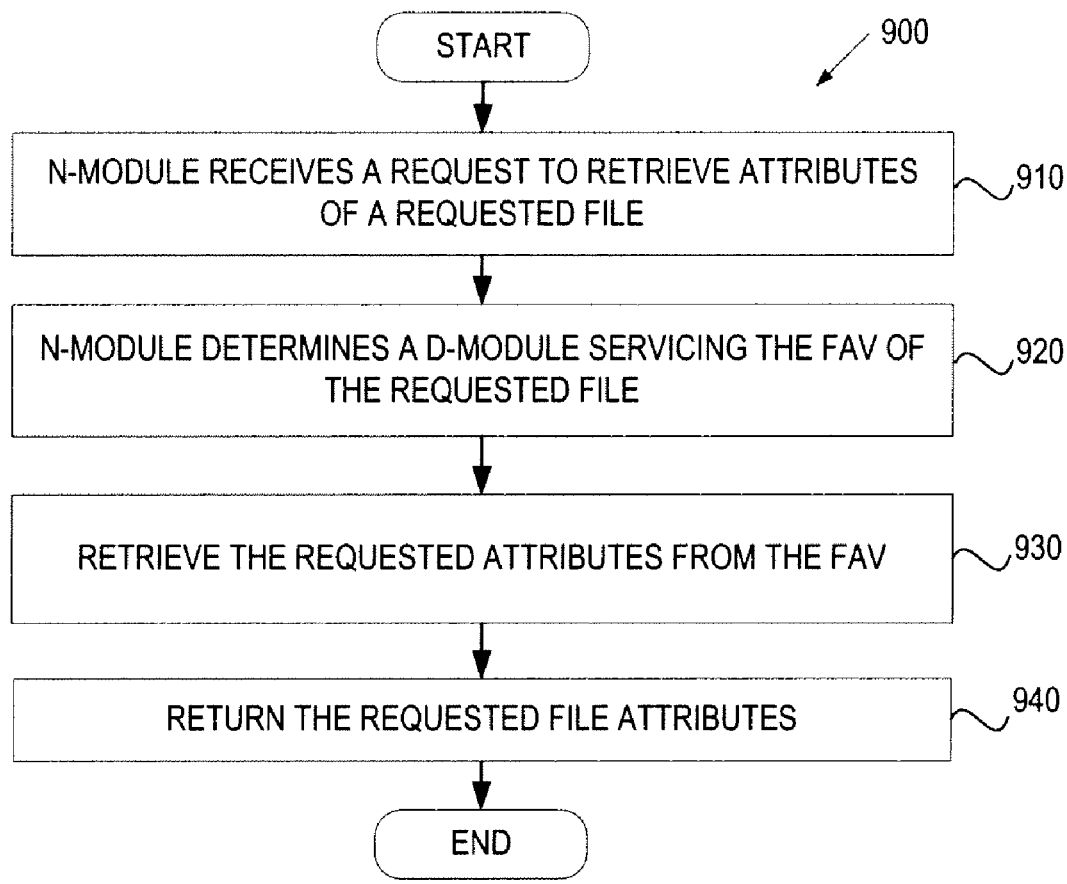
FIG. 9 is a flow diagram illustrating an embodiment of a process for retrieving file attributes.

FIG. 9 is a flowchart illustrating a process 900 for retrieving attributes of a file in accordance with an embodiment of the present invention. The process 900 begins at block 910 where one of the N-modules 120 receives a request from a client to retrieve (read) file attributes. The request includes a file handle containing an inode number of the requested file. At block 920, the N-module 120 forwards the request to the D-module 140 servicing the FAV of the requested file. The FAV can be calculated using the inode number in the file handle. At block 930, the VSM 370 on the FAV retrieves the requested attributes from the inode of the requested file stored on the FAV. The process 900 then completes at block 940 where the VSM 370 of the FAV returns the requested attributes.

Thus, a method and system for striping directories have been described. Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a cluster of storage server nodes, the method comprising:
    mapping a given one of a plurality of filenames in a directory to a given one of the storage server nodes according to a first mapping, each storage server node services one of a plurality of persistent mass storage facilities;
    choosing an identifier of a meta-data container that stores meta-data attributes of the given filename, such that the identifier is mapped to the given storage server node according to a second mapping;
    distributing the directory, including the filenames and pointer information that points filenames to corresponding identifiers of corresponding meta-data containers, across the storage server nodes for storage on the persistent mass storage facilities according to the first mapping of the filenames; and
    in response to renaming the given filename to a second filename that is mapped to a different one of the storage server nodes according to the first mapping, moving the pointer information of the second filename to the different storage server node while retaining the meta-data attributes of the second filename on the given storage server node.

2. The method of claim 1, wherein mapping a given one of a plurality of filenames further comprises:
    converting each of the filenames into a volume identifier to identify a volume serviced by one of the storage server nodes, the meta-data container associated with a file having the filename.

3. The method of claim 2, wherein converting each of the filenames into a volume identifier further comprises:
    converting each of the filenames into a numerical string; and
    hashing and mapping the numerical string into the volume identifier.

4. The method of claim 1, further comprising:
    creating a new directory entry in the directory, the new directory entry including a new filename for a new file;
    mapping the new filename to a volume serviced by one of the storage server nodes; and assigning an identifier of a meta-data container to the new filename, the identifier identifying the mapped volume, wherein the volume stores a copy of meta-data attributes of the new file and a portion of the directory including the identifier.

5. The method of claim 1, further comprising:
receiving a request to retrieve meta-data attributes of a file in the directory; and
returning a file handle for the directory, the file handle indicating whether the directory is striped by the filenames.

6. The method of claim 1, further comprising:
receiving a request for a file at a first storage server node, the request specifying a requested filename associated with the file; and
forwarding the request from the first storage server node to a second storage server node in response to a determination that the requested filename is mapped to a volume serviced by the second storage server.

7. A storage system comprising:
a plurality of arrays of storage devices to store volumes that are organized as a striped volume set for a directory, wherein the directory contains filenames and pointer information that points the filenames to corresponding identifiers of corresponding meta-data containers, and wherein the directory is distributed across the striped volume set according to a first mapping of the filenames in the directory to the volumes; and
a plurality of storage server nodes coupled to the arrays of storage devices, each storage server node servicing at least one of the volumes in the striped volume set,
wherein a given one of the filename is mapped to a given one of the storage server nodes according to the first mapping, and an identifier of a meta-data container that stores meta-data attributes of the given filename is chosen such that the identifier is mapped to the given storage server node according to a second mapping, and
wherein in response to renaming the given filename to a second filename that is mapped to a different one of the storage server nodes according to the first mapping, the storage server nodes move the pointer information of the second filename to the different storage server node while retaining the meta-data attributes of the second filename on the given storage server node.

8. The storage system of claim 7, wherein the storage server nodes map the filenames by converting each of the filenames into a numerical string and hashing and mapping the numerical string into a volume identifier that identifies one of the volumes.

9. The storage system of claim 7, further comprising:
a switching fabric via which the storage server nodes communicate, the switching fabric forwards a request for a file from a first node of the storage server nodes to a second node of the storage server nodes in response to a determination by the first node that a filename of the file is mapped to one of the volumes serviced by the second node.

10. The storage system of claim 7, wherein each of the storage server nodes further comprises:
a network module to receive a request for a file from a client, and to hash a filename associated with the file to identify one of the storage server nodes as an owner of the filename; and
a data module to perform data operations according to the request.

11. The storage system of claim 7, wherein the meta-data container is associated with files having the filenames.

12. The storage system of claim 7, wherein the storage server nodes, in response to a request to create a new file having a new filename in the directory, store the mapping of the new filename and meta-data attributes of the new file in a same one of the volumes.

13. The storage system of claim 7, wherein a plurality of directories are distributed across the striped volume set, one or more of the directories distributed with different striping algorithms based on which the mapping of the filenames is performed.

14. A method of operating a cluster of storage server nodes, the method comprising:
receiving a request for a file having a filename, the request involving retrieving meta-data attributes of the file from a directory that holds the filename;
mapping the filename to a volume according to a first mapping;
directing the request to a given one of the storage server nodes servicing the volume according to the first mapping;
obtaining pointer information that points the filename to an identifier of a meta-data container that stores the meta-data attributes of the filename;
mapping the identifier to the given storage server node according to a second mapping and performing file operations according to the request,
wherein the identifier was chosen when creating the file such that the identifier is mapped to the given storage server node according to the second mapping, and
in response to renaming the filename to a second filename that is mapped to a different one of the storage server nodes according to the first mapping, moving the pointer information of the second filename to the different storage serve node while retaining the meta-data attributes of the second filename on the given storage server node.

15. The method of claim 14, wherein mapping the filename further comprises:
converting the filename into a numerical string; and
hashing and mapping the numerical string into a volume identifier that identifies the volume.

16. The method of claim 14, further comprising:
receiving the request at a first storage server node; and
forwarding the request from the first storage server node to a second storage server node through a switching fabric in response to a determination that the filename is mapped to the volume serviced by the second storage server.

17. The method of claim 14, further comprising:
creating a new file having a new filename in the directory; and
storing the mapping of the new filename and meta-data attributes of the new file in a same volume.

18. The method of claim 14, further comprising:
associating the directory with a file handle to provide access to the directory, the file handle indicating whether the directory is striped and which striping algorithm is used.

19. The method claim 14, further comprising:
distributing a plurality of directories across a set of volumes, one or more of the directories distributed with different striping algorithms based on which the mapping of the filename is performed.

* * * * *